US010924206B2

(12) United States Patent
Wang et al.

(10) Patent No.: US 10,924,206 B2
(45) Date of Patent: Feb. 16, 2021

(54) ADAPTIVE MODULATION AND CODING METHOD AND BASE STATION

(71) Applicant: HUAWEI TECHNOLOGIES CO., LTD., Guangdong (CN)

(72) Inventors: Yi Wang, Shanghai (CN); Chengyi Wang, Shanghai (CN); Jie Lin, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 58 days.

(21) Appl. No.: 16/351,085

(22) Filed: Mar. 12, 2019

(65) Prior Publication Data

US 2019/0215097 A1 Jul. 11, 2019

Related U.S. Application Data

(63) Continuation of application No. PCT/CN2016/098859, filed on Sep. 13, 2016.

(51) Int. Cl.
*H04L 1/00* (2006.01)
*H04W 72/12* (2009.01)
(Continued)

(52) U.S. Cl.
CPC .......... *H04L 1/0026* (2013.01); *H04L 1/0003* (2013.01); *H04L 1/0035* (2013.01);
(Continued)

(58) Field of Classification Search
CPC ... H04L 1/0026; H04L 1/0003; H04L 1/0035; H04L 1/0072; H04L 1/0009; H04L 1/203;
(Continued)

(56) References Cited

U.S. PATENT DOCUMENTS

2005/0111429 A1\* 5/2005 Kim ................. H04L 5/023
370/344
2005/0286409 A1\* 12/2005 Yoon ................ H04L 5/023
370/210
(Continued)

FOREIGN PATENT DOCUMENTS

CN 101132227 A 2/2008
CN 102098147 A 6/2011
(Continued)

OTHER PUBLICATIONS

Office Action issued in Japanese Application No. 2019-513,981, dated Feb. 2, 2017, 9 pages (With English Translation).
(Continued)

*Primary Examiner* — Jenee Holland
(74) *Attorney, Agent, or Firm* — Fish & Richardson P.C.

(57) ABSTRACT

An adaptive modulation and coding method includes: receiving, by a base station, a channel quality indicator CQI sent by a first terminal; determining, by the base station, a subframe for scheduling the first terminal; determining, by the base station, a subframe set to which the subframe belongs, where the subframe set is a first subframe set or a second subframe set, and the first subframe set and the second subframe set correspond to different CQI adjustment amounts; adjusting, by the base station, the CQI based on a CQI adjustment amount corresponding to the subframe set to which the subframe belongs; and determining, by the base station based on an adjusted CQI, a modulation and coding scheme MCS for scheduling the first terminal.

18 Claims, 3 Drawing Sheets

(51) Int. Cl.
*H04W 76/28* (2018.01)
*H04L 5/00* (2006.01)
*H04W 72/04* (2009.01)
*H04L 1/20* (2006.01)

(52) U.S. Cl.
CPC .......... *H04L 1/0072* (2013.01); *H04L 5/0055* (2013.01); *H04W 72/0446* (2013.01); *H04W 72/12* (2013.01); *H04W 72/1226* (2013.01); *H04W 76/28* (2018.02); *H04L 1/0009* (2013.01); *H04L 1/203* (2013.01)

(58) Field of Classification Search
CPC .............. H04L 5/0055; H04W 72/0446; H04W 72/12; H04W 72/1226; H04W 76/28
See application file for complete search history.

(56) References Cited

U.S. PATENT DOCUMENTS

| | | | | |
|---|---|---|---|---|
| 2007/0082619 | A1* | 4/2007 | Zhang | H04W 52/286 455/69 |
| 2011/0249643 | A1* | 10/2011 | Barbieri | H04L 1/0028 370/329 |
| 2012/0207054 | A1* | 8/2012 | Okubo | H04L 1/1671 370/252 |
| 2013/0196675 | A1* | 8/2013 | Xiao | H04B 17/309 455/452.1 |
| 2013/0315185 | A1* | 11/2013 | Kim | H04L 5/0057 370/329 |
| 2014/0036797 | A1* | 2/2014 | Palanivelu | H04L 1/0027 370/329 |
| 2014/0092785 | A1* | 4/2014 | Song | H04W 28/0278 370/280 |
| 2014/0126467 | A1 | 5/2014 | Lu et al. | |
| 2014/0334355 | A1* | 11/2014 | Ekpenyong | H04W 72/0446 370/280 |
| 2014/0355468 | A1* | 12/2014 | Li | H04W 24/10 370/252 |
| 2015/0036522 | A1 | 2/2015 | Maruta | |
| 2015/0085767 | A1* | 3/2015 | Einhaus | H04L 1/0016 370/329 |
| 2015/0201428 | A1 | 7/2015 | Mills et al. | |
| 2016/0066282 | A1* | 3/2016 | Ouchi | H04L 5/00 455/522 |
| 2016/0323855 | A1* | 11/2016 | Nakamura | H04L 1/0016 |

FOREIGN PATENT DOCUMENTS

| | | |
|---|---|---|
| CN | 102265696 A | 11/2011 |
| CN | 102790654 A | 11/2012 |
| CN | 103259611 A | 8/2013 |
| CN | 103828415 A | 5/2014 |
| WO | 2013118409 A1 | 8/2013 |
| WO | 2013134935 A1 | 9/2013 |
| WO | 2014023963 A3 | 5/2014 |
| WO | 2016172897 A1 | 11/2016 |

OTHER PUBLICATIONS

International Search Report and Written Opinion issued in International Application No. PCT/CN2016/098859 dated May 31, 2017, 15 pages.
Extended European Search Report issued in European Application No. 16915948.0 dated Jul. 1, 2019, 7 pages.
Office Action issued in Chinese Application No. 201680088954.X dated Mar. 4, 2020, 21 pages.
Office Action issued in Korean Application No. 2019-7009332 dated Jul. 30, 2020, 8 pages (with English translation).
ZTE, "DL interference measurement and CSI feedback enhancement in multi-cell scenario," 3GPP TSG RAN WG1 #74, R1-133055, Barcelona, Spain, May 19-23, 2013, 6 pages.

* cited by examiner ns of the first aspect, the method further includes: dividing, by the base station, a plurality of scheduling subframes into the first subframe set and the second subframe set.
ADAPTIVE MODULATION AND CODING METHOD AND BASE STATION

CROSS-REFERENCE TO RELATED APPLICATIONS

This application is a continuation of International Patent Application No. PCT/CN2016/098859, filed on Sep. 13, 2016, the disclosure of which is hereby incorporated by reference in its entirety.

TECHNICAL FIELD

The present invention relates to the communications field, and in particular, to an adaptive modulation and coding method and a base station.

BACKGROUND

To meet an increasingly high requirement of people for data services, the 3rd Generation Partnership Project (3GPP, 3rd Generation Partnership Project) launches a "Long Term Evolution (LTE, Long Term Evolution) project". The LTE project is intended to provide more powerful data service support by using a continuously evolving 3G system, to provide users with better services. Key technologies of an LTE system include scheduling, and adaptive modulation and coding technologies.

In the prior art, a channel quality indicator (Channel quality indicator, CQI) reported by user equipment is constantly adjusted by using an adaptive modulation and coding (Adaptive Modulation and Coding, AMC) mechanism, and a modulation and coding scheme (Modulation and Coding Scheme, MCS) is dynamically adjusted by using acknowledgement (Acknowledgement, ACK)/negative acknowledgement (Negative Acknowledgement, NACK) information and a target block error rate, so that a downlink data block rate (Block Error Rate, BLER) of the UE converges to a target value. A formula of a CQI adjustment algorithm in the AMC mechanism is:

$$\Delta CQI = FinalDLCqiAdjStepOfbler * \frac{BlerTarget - BlerMeas}{1 - BlerTarget}$$

where FinalDLCqiAdjStepOfbler is an adjustment step, and a default value may be 0.1; BLERTarget is a target block error rate, and a default value may be 10%; BLERMeas is a measured value of the block error rate; and when a NACK is received, BLERMeas is 1, and when an ACK is received, BLERMeas is 0.

However, in an actual network, interference of a neighboring cell to a serving cell changes in real time. Especially after a pilot breathing algorithm is enabled, interference in the network changes regularly. The existing AMC mechanism cannot adapt to the real-time change of the interference in the serving cell. Therefore, an MCS for data transmission of a subframe, in the serving cell, that is slightly interfered with by the neighboring cell mainly depends on a seriously interfered subframe. This affects data transmission efficiency and a throughput of a network system.

SUMMARY

This application proposes an adaptive modulation and coding method and a base station, to improve data transmission efficiency and a throughput of a network system.

According to a first aspect, an adaptive modulation and coding method is provided, including: receiving, by a base station, a channel quality indicator CQI sent by a first terminal; determining, by the base station, a subframe for scheduling the first terminal; determining, by the base station, a subframe set to which the subframe belongs, where the subframe set is a first subframe set or a second subframe set, and the first subframe set and the second subframe set correspond to different CQI adjustment amounts; adjusting, by the base station, the CQI based on a CQI adjustment amount corresponding to the subframe set to which the subframe belongs; and determining, by the base station based on an adjusted CQI, a modulation and coding scheme MCS for scheduling the first terminal.

In this solution, after the base station determines the subframe for scheduling the first terminal, the base station may determine the subframe set to which the subframe belongs, where the subframe set may be the first subframe set or the second subframe set; and then adjusts, based on the CQI adjustment amount corresponding to the subframe set, the CQI sent by the first terminal. In this way, a waste of a high signal-to-noise ratio of a low-interference subframe caused by using only one set of CQI adjustment amount in the prior art is avoided. Therefore, the base station can efficiently use the high signal-to-noise ratio of the low-interference subframe in a current cell, thereby improving transmission efficiency of downlink data and a throughput of a network system. In addition, in comparison with the prior art, a CQI reported by a terminal can be adjusted flexibly, thereby improving system flexibility.

With reference to the first aspect, in some implementations of the first aspect, the method further includes: dividing, by the base station, a plurality of scheduling subframes into the first subframe set and the second subframe set.

With reference to the first aspect, in some implementations of the first aspect, the dividing, by the base station, a plurality of scheduling subframes into the first subframe set and the second subframe set includes: obtaining, by the base station, acknowledgement ACK/negative acknowledgement NACK information of a plurality of scheduled terminals; and dividing, by the base station, the plurality of scheduling subframes into the first subframe set and the second subframe set based on the ACK/NACK information of the plurality of scheduled terminals.

In this solution, the base station may divide the plurality of scheduling subframes into the first subframe set and the second subframe set based on the ACK/NACK information of the plurality of scheduled terminals, and does not need to obtain a data bearer state of a subframe of a neighboring cell of a serving cell in which the terminal is located from the neighboring cell, thereby improving system flexibility and solution practicability.

With reference to the first aspect, in some implementations of the first aspect, the dividing, by the base station, the plurality of scheduling subframes into the first subframe set and the second subframe set based on the ACK/NACK information of the plurality of scheduled terminals includes: collecting, by the base station, statistics about a block error rate BLER of each of the plurality of scheduling subframes based on the ACK/NACK information of the plurality of scheduled terminals; and dividing, by the base station, the plurality of scheduling subframes into the first subframe set and the second subframe set based on the BLER of each of the plurality of scheduling subframes.

With reference to the first aspect, in some implementations of the first aspect, the dividing, by the base station, the plurality of scheduling subframes into the first subframe set and the second subframe set based on the BLER of each of the plurality of scheduling subframes includes: when an adjustment moment arrives, obtaining, by the base station, a BLER of each of the plurality of scheduling subframes prior to the adjustment moment; and adjusting, by the base station based on the BLER of each of the plurality of scheduling subframes prior to the adjustment moment, subframes in a first subframe set and a second subframe set prior to the adjustment moment, to obtain the first subframe set and the second subframe set.

In this solution, the base station may collect statistics about the BLER of each scheduling subframe within an adjustment period prior to the adjustment moment, and adjust, based on the BLER of the scheduling subframe, the first subframe set and the second subframe set within the adjustment period prior to the adjustment moment, so that a subframe set to which a scheduling subframe belongs can be dynamically changed, thereby improving system flexibility.

With reference to the first aspect, in some implementations of the first aspect, the first subframe set prior to the adjustment moment includes a first scheduling subframe, and the adjusting, by the base station based on the BLER of each of the plurality of scheduling subframes prior to the adjustment moment, subframes in a first subframe set and a second subframe set prior to the adjustment moment, to obtain the first subframe set and the second subframe set includes: when the adjustment moment arrives, obtaining, by the base station, a BLER of the first subframe set prior to the adjustment moment; and if the BLER of the first subframe set prior to the adjustment moment is greater than a first threshold and a BLER of a first subframe in the first subframe set prior to the adjustment moment is greater than a second threshold, changing, by the base station at the adjustment moment, the first scheduling subframe from the first subframe set prior to the adjustment moment to the second subframe set prior to the adjustment moment, to obtain the first subframe set and the second subframe set.

With reference to the first aspect, in some implementations of the first aspect, the second subframe set prior to the adjustment moment includes a second scheduling subframe, and the adjusting, by the base station based on the BLER of each of the plurality of scheduling subframes prior to the adjustment moment, subframes in a first subframe set and a second subframe set prior to the adjustment moment, to obtain the first subframe set and the second subframe set includes: when the adjustment moment arrives, obtaining, by the base station, a BLER of the second subframe set prior to the adjustment moment; and if the BLER of the second subframe set prior to the adjustment moment is greater than a third threshold and a BLER of a second subframe in the second subframe set prior to the adjustment moment is less than or equal to a fourth threshold, changing, by the base station at the adjustment moment, the second subframe from the second scheduling subframe set prior to the adjustment moment to the first subframe set prior to the adjustment moment, to obtain the first subframe set and the second subframe set.

With reference to the first aspect, in some implementations of the first aspect, the collecting, by the base station, statistics about a block error rate BLER of each of the plurality of scheduling subframes based on the ACK/NACK information of the plurality of scheduled terminals includes: collecting, by the base station, statistics about the BLER of each of the plurality of scheduling subframes by using the following formula:

$$Bler(i) = \frac{N_{NACK}(i) + N_{DTX}(i)}{N_{NACK}(i) + N_{DTX}(i) + N_{ACK}(i)}$$

where BLER (i) represents a BLER of an $i^{th}$ subframe in the plurality of scheduling subframes within a preset time; $N_{NACK}(i)$ represents a quantity of NACKs that are fed back by a terminal within the preset time based on downlink data transmitted in the $i^{th}$ subframe; $N_{ACK}(i)$ represents a quantity of ACKs that are fed back by the terminal within the preset time based on the downlink data transmitted in the $i^{th}$ subframe; and $N_{DTX}(i)$ represents a quantity of discontinuous transmission DTX states in which no signal is sent by the terminal in the $i^{th}$ subframe within the preset time.

With reference to the first aspect, in some implementations of the first aspect, the first terminal is a terminal of which an amount of data received and reaching radio link control (Radio Link Control, RLC) per second is greater than a preset threshold.

According to a second aspect, a base station is provided, including a unit or a module for performing the method described in any one of the first aspect or the implementations of the first aspect.

According to a third aspect, a base station is provided, including a receiver, a memory, and a processor, where the memory is configured to store a program, and the processor is configured to execute the program. When the program is executed, the processor is specifically configured to perform the method described in the first aspect or any implementation of the first aspect.

According to a fourth aspect, a computer readable medium is provided. The computer readable medium is configured to store program code, and the program code includes an instruction for performing the method described in any one of the first aspect or the implementations of the first aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

It should be understood that the technical solutions of the present invention may be applied to various communications systems, for example, a Long Term Evolution (Long Term Evolution, LTE for short) system, and a future 5G communications system.

It should be understood that, for the LTE system, different frame structures are defined for different duplex modes. For example, in a time division duplex (Time Division Duplex, TDD) communications system, a radio frame has a length of 10 milliseconds (ms), and includes two half-frames having a length of 5 ms. Each half-frame includes five subframes having a length of 1 ms. In other words, the entire radio frame is divided into 10 subframes having a length of 1 ms. For another example, in a frequency division duplex (Frequency Division Duplex, FDD) communications system, each radio frame of 10 ms is divided into 10 subframes of 1 ms. Each subframe includes two slots, and each slot is 0.5 ms, and may include several physical resource blocks (Physical Resource Block, PRB).

Figure 1:
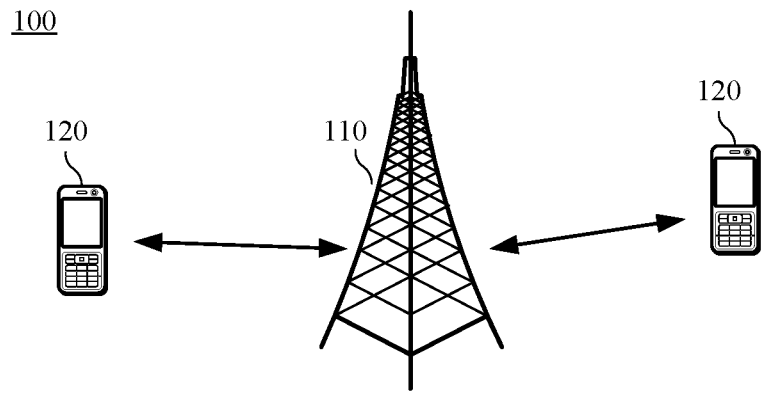
FIG. 1 is a schematic diagram of a communications system according to an embodiment of the present invention.

FIG. 1 is a schematic diagram of a communications system 100 that can be applied to the embodiments of the present invention. The communications system 100 may include at least one network device 1101, for example, a base station or a base station controller. Each network device 1101 can provide communications coverage for a specific geographic area, and can communicate with a terminal (for example, UE) within the coverage area (a cell). The network device 1101 may be an evolved NodeB (evolved NodeB, "eNB" or "eNodeB" for short) in an LTE system, or a radio controller in a cloud radio access network (Cloud Radio Access Network, "CRAN" for short). Alternatively, the network device may be a relay station, an access point, an in-vehicle device, a wearable device, a network side device in a future 5G network, a network device in a future evolved public land mobile network (Public Land Mobile Network, "PLMN" for short), or the like.

The communications system 100 further includes a plurality of terminals 120 within a coverage area of the network device 1101. The plurality of terminals may be terminals of different standards. For example, two terminals shown in FIG. 1 may be a 4G terminal and a 5G terminal, respectively. FIG. 1 illustratively shows one network device and two terminals. Optionally, the communications system 100 may include a plurality of network devices, and there may be another quantity of terminals within a coverage area of each network device. This is not limited in this embodiment of the present invention.

It should further be understood that a terminal may include user equipment (User Equipment, "UE" for short), which may also be referred to as a mobile terminal, mobile user equipment, or the like, and may communicate with one or more core networks by using a radio access network (for example, a Radio Access Network, "RAN" for short). The user equipment may be a mobile terminal, such as a mobile phone (or referred to as a "cellular" phone) or a computer having a mobile terminal, for example, may be a portable, pocket-sized, handheld, computer built-in, or in-vehicle mobile apparatus, which exchanges voice and/or data with the radio access network.

Optionally, the communications system 100 may further include other network entities such as a network controller and a mobility management entity. This is not limited in this embodiment of the present invention.

Figure 2:
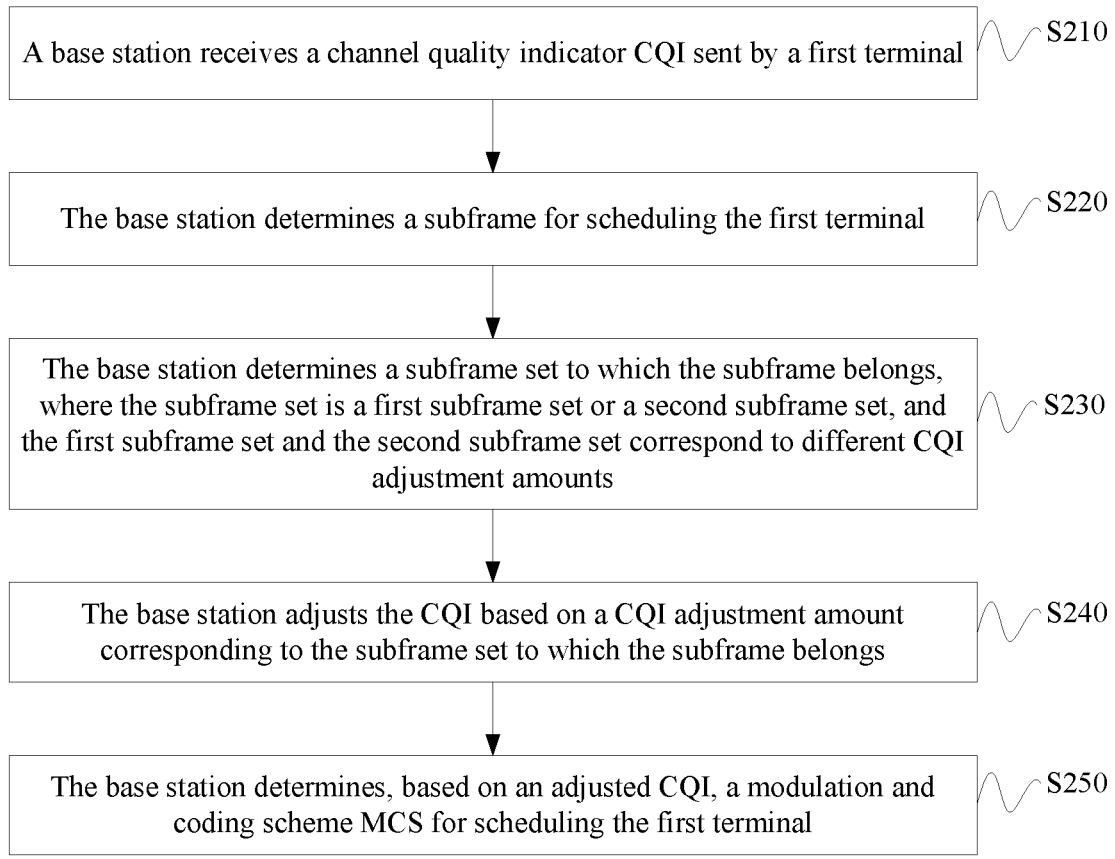
FIG. 2 is a schematic flowchart of an adaptive modulation and coding method according to an embodiment of the present invention.

FIG. 2 is a schematic flowchart of an adaptive modulation and coding method according to an embodiment of the present invention. The method shown in FIG. 2 may be performed by a base station. The method includes the following steps.

S210. The base station receives a CQI sent by a first terminal.

Specifically, in this embodiment of the present invention, when the base station needs to send downlink data to the first terminal, the base station may send a cell-specific reference signal (Cell-Specific Reference Signal, CRS) to the first terminal, and the first terminal may generate the CQI based on the CRS and send the CQI to the base station.

Optionally, in some embodiments, the CQI may further include an MCS recommended by the first terminal.

Optionally, in some embodiments, the base station may alternatively obtain an MCS based on a preset table of mapping between a CQI and an MCS.

S220. The base station determines a subframe for scheduling the first terminal.

Specifically, after receiving the CQI sent by the first terminal, the base station may allocate a downlink resource to the first terminal based on the CQI by using a policy. For example, the base station may determine, based on the CQI reported by the first terminal, the subframe (for example, subframe 3 in a frame whose frame number is 10) for scheduling the first terminal and an MCS applicable to the channel quality.

Optionally, in some embodiments, the first terminal may be a large-packet user terminal, and data that is transmitted between the base station and the first terminal by using a subframe may be large-packet user data. Specifically, the large-packet user terminal is online for a long time and is scheduled for many times during downlink data transmission. Therefore, a higher throughput gain can be obtained by using a solution, provided in this embodiment of the present invention, of dividing subframe sets and maintaining CQI adjustment amounts corresponding to the subframe sets.

Specifically, in this embodiment of the present invention, before performing data transmission with a terminal, the base station may first identify whether the terminal is a large-packet user terminal. Specifically, in this embodiment of the present invention, when an amount of data, of a terminal, reaching radio link control (Radio Link Control, RLC) per second is greater than a preset threshold, the base station may identify the terminal as a large-packet user terminal. It should be understood that a value of the preset threshold is not specifically limited in this embodiment of the present invention. For example, if a to-be-transmitted data amount is 0, the preset threshold may be 1250000 bytes (byte). In other words, if an amount of data, of a terminal, reaching RLC per second is greater than 1250000 bytes, the base station identifies the terminal as a large-packet user terminal. For another example, if a to-be-transmitted data amount is not 0, the preset threshold may be Min{the to-be-transmitted data amount*1000/8 bytes, 1250000 bytes}, where Min{the to-be-transmitted data amount*1000/8 bytes, 1250000 bytes} indicates that the preset threshold is a smaller value between the to-be-transmitted data amount*1000/8 bytes and 1250000 bytes.

S230. The base station determines a subframe set to which the subframe belongs, where the subframe set is a first subframe set or a second subframe set, and the first subframe set and the second subframe set correspond to different CQI adjustment amounts.

Figure 3:
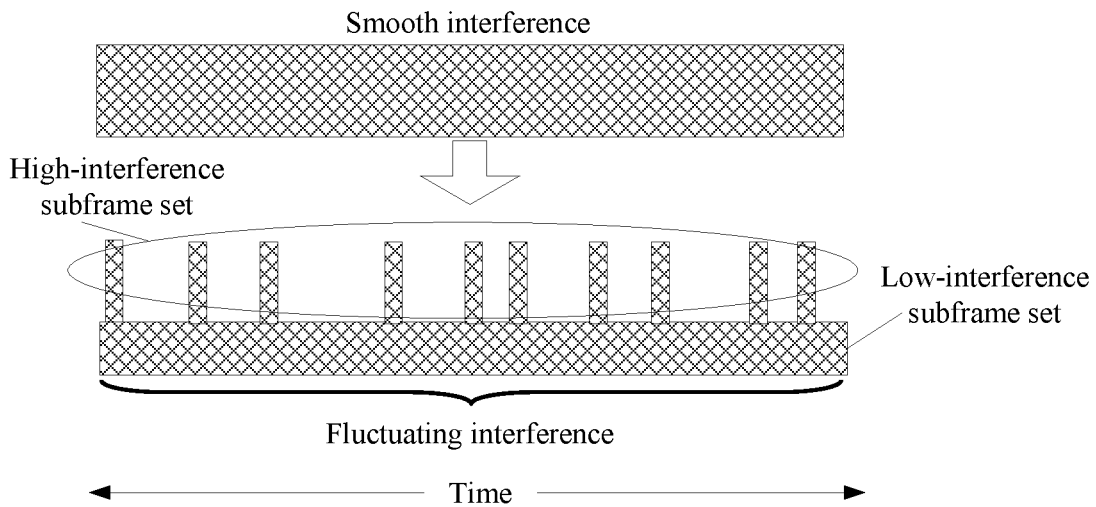
FIG. 3 is a schematic diagram of changes of interference to a serving cell in light load after pilot breathing is enabled.

In this embodiment of the present invention, the base station separately maintains the CQI adjustment amounts respectively corresponding to the first subframe set and the second subframe set. This is more flexible in comparison with the prior art. Different CQI adjustment amounts are maintained for different subframe sets, thereby improving data transmission efficiency and a throughput of a network system. For example, in a scenario shown in FIG. 3 in which high interference alternates with low interference, high-interference subframes constitute a first subframe set, and low-interference subframes constitute a second subframe set. Therefore, scheduling subframes in the two sets are adjusted by using different CQI adjustment amounts, and the data transmission efficiency and the throughput of the network system can be improved to a relatively great extent. Details are to be described below.

It can be learned from the CQI adjustment algorithm in the AMC mechanism provided above that, when the base station receives a NACK sent by a terminal, a CQI adjustment amount is approximately 10 times a CQI adjustment amount when an ACK is received. Therefore, a proportion of subframes for sending a system message by a neighboring cell is greater than a BLER target value that is specified by the AMC mechanism. In other words, over 10% of the subframes of the neighboring cell have strong interference. The CQI adjustment amount calculated by using the AMC mechanism mainly depends on channel quality in this proportion of high-interference subframes, and an MCS that is finally selected by the base station also mainly depends on the channel quality in this proportion of high-interference subframes. Therefore, even if a terminal is scheduled in a subframe with no interference or low interference, a selected MCS for scheduling the terminal has a relatively low order. This results in a failure to reflect a characteristic of a high signal-to-noise ratio (Signal-to-Noise Ratio, SNR) of the low-interference subframe, and reduces a throughput of a serving cell.

Therefore, in some embodiments, scheduling subframes may be divided into a first subframe set and a second subframe set based on an interference status of a neighboring cell. The first subframe set suffers less interference of the neighboring cell than the second subframe set. Therefore, the first subframe set may also be referred to as a low-interference subframe set, and the second subframe set may also be referred to as a high-interference subframe set. The base station maintains respective CQI adjustment amounts of the low-interference subframe set and the high-interference subframe set, thereby avoiding a prior-art problem that a high signal-to-noise ratio of a low-interference subframe cannot be reflected because only one set of CQI adjustment amount is used, and improving a throughput of a cell.

It should be noted that a division occasion and a division manner for the subframe sets are not specifically limited in this embodiment of the present invention. For example, a fixed division manner may be used to directly divide the subframes into the first subframe set and the second subframe set.

Optionally, in some embodiments, the first subframe set and the second subframe set may be divided based on an adjustment period. When the adjustment period arrives, the base station may re-divide a plurality of scheduling subframes into the first subframe set and the second subframe set. A manner in which the base station divides the plurality of scheduling subframes into the first subframe set and the second subframe set is to be described below in detail, and details are not described herein.

S240. The base station adjusts the CQI based on a CQI adjustment amount corresponding to the subframe set to which the subframe belongs.

S250. The base station determines, based on an adjusted CQI, a modulation and coding scheme MCS for scheduling the first terminal.

Specifically, in this embodiment of the present invention, the base station may adjust, based on the CQI adjustment amount corresponding to the subframe set to which the subframe for scheduling the first terminal belongs, the CQI reported by the first terminal, so as to determine, based on the adjusted CQI, the modulation and coding scheme MCS for scheduling the first terminal. For example, in this embodiment of the present invention, a CQI adjustment amount corresponding to the first subframe set may be 2, a CQI adjustment amount corresponding to the second subframe set may be −1, and the CQI that is reported by the first terminal and received by the base station is 3. When the base station determines that the subframe for scheduling the first terminal belongs to the first subframe set, the base station may determine that an adjusted CQI for scheduling the first terminal is 5, and the base station may determine, based on the adjusted CQI (that is, the CQI having a value of 5), an MCS for scheduling the first terminal. Certainly, if the base station determines that the subframe for scheduling the first terminal belongs to the second subframe set, the base station may determine that an adjusted CQI for scheduling the first terminal is 2, and the base station may determine, based on the adjusted CQI (that is, the CQI having a value of 2), an MCS for scheduling the first terminal.

According to the adaptive modulation and coding method provided in this embodiment of the present invention, the base station may determine the subframe set to which the subframe for scheduling the first terminal belongs, and adjust, based on the CQI adjustment amount corresponding to the subframe set, the CQI reported by the first terminal. This is more flexible in comparison with the prior art.

Optionally, in some embodiments, the base station may adjust, based on ACK/NACK information sent in the subframe for scheduling the first terminal, the CQI adjustment amount corresponding to the subframe set to which the subframe for scheduling the first terminal belongs.

Specifically, in this embodiment of the present invention, when the base station determines the subframe set to which the subframe for scheduling the first terminal belongs, the base station performs downlink data transmission with the first terminal by using the subframe, and the terminal may feed back, to the base station, ACK/NACK information of data transmitted in the subframe. After receiving the ACK/NACK information, the base station may use the AMC mechanism to adjust the CQI adjustment amount corresponding to the subframe set to which the subframe belongs.

Optionally, in some embodiments, the adaptive modulation and coding method in this embodiment of the present invention may further include:

dividing, by the base station, a plurality of scheduling subframes into the first subframe set and the second subframe set.

It should be noted that, in this embodiment of the present invention, the plurality of scheduling subframes may be subframes for scheduling a plurality of terminals, or may be subframes for scheduling one terminal.

Optionally, in some embodiments, the base station may receive indication information of a base station corresponding to a neighboring cell, and the base station may divide the plurality of scheduling subframes into the first subframe set and the second subframe set based on the indication information. The indication information may indicate a status of interference of the neighboring cell to a cell of the first terminal, or the indication information indicates a division manner of the plurality of scheduling subframes. In this embodiment of the present invention, the indication information is received directly from the base station corresponding to the neighboring cell, and the plurality of scheduling subframes are directly divided based on the indication information. The division manner is simple to implement and convenient to operate.

Optionally, in some embodiments, the base station may divide, based on a data bearer state of a subframe in a neighboring cell of a serving cell of the first terminal, the plurality of scheduling subframes in the serving cell into the first subframe set and the second subframe set. Alternatively, the base station may divide the plurality of scheduling subframes in the serving cell into the first subframe set and the second subframe set based on a level of interference of each subframe in the neighboring cell to the serving cell.

It should be understood that, in this embodiment of the present invention, the base station determines the subframe for scheduling the first terminal, the subframe may be referred to as the subframe in the serving cell, and the serving cell may have at least one neighboring cell.

It should be understood that the data bearer state may include: carrying no data, carrying a small amount of data, carrying a relatively large amount of data, and the like. For example, a data bearer state of a subframe (for example, subframes whose numbers are 2 and 3) that is disabled may be the state of carrying no data; a data bearer state of a subframe whose number is 0 and that carries a broadcast message may be carrying a relatively large amount of data; and a data bearer state of a subframe (for example, subframes whose numbers are 1 and 4) that is not disabled may be carrying a small amount of data.

It should further be understood that when a data bearer state of a subframe of the neighboring cell indicates that the subframe carries a larger amount of data, a level of interference of the subframe to the serving cell is higher. In other words, the data bearer state of the subframe of the neighboring cell can also indirectly indicate the level of the interference of the subframe of the neighboring cell to the serving cell.

For example, for 10 subframes whose numbers are from 0 to 9, data bearer states of the subframes may include the following: A subframe whose number is 0 and a subframe whose number is 5 carry a relatively large amount of data; a subframe whose number is 1, a subframe whose number is 4, and a subframe whose number is 9 carry a small amount of data; and a subframe whose number is 2, a subframe whose number is 3, a subframe whose number is 6, a subframe whose number is 7, and a subframe whose number is 8 carry no data. Levels of interference of the subframes carrying a relatively large amount of data to the serving cell are high interference, levels of interference of the subframes carrying a small amount of data to the serving cell are medium interference, and levels of interference of the subframes carrying no data to the serving cell are low interference.

It should be noted that, in this embodiment of the present invention, when the plurality of scheduling subframes are divided into the first subframe set and the second subframe set by using the data bearer state of the subframe of the neighboring cell of the serving cell of the first terminal or the level of the interference of the neighboring cell to the serving cell, the serving cell and the neighboring cell need to be time-synchronized cells.

Optionally, in some embodiments, the dividing, by the base station, a plurality of scheduling subframes into the first subframe set and the second subframe set may further include:

obtaining, by the base station, ACK/NACK information of a plurality of scheduled terminals; and dividing, by the base station, the plurality of scheduling subframes into the first subframe set and the second subframe set based on the ACK/NACK information of the plurality of scheduled terminals.

In this embodiment of the present invention, the plurality of scheduling subframes are directly divided into the first subframe set and the second subframe set based on the ACK/NACK information of the plurality of scheduled terminals with no reference to information about the neighboring cell, that is, the serving cell and the neighboring cell of the first terminal do not need to be time-synchronized, thereby improving system flexibility.

Specifically, in this embodiment of the present invention, after the base station sends data to a terminal by using a scheduling subframe, the terminal may send ACK/NACK information for downlink data in the scheduling subframe to the base station. When the terminal correctly receives the downlink data sent by the base station, the terminal may send the ACK information to the base station. When the terminal does not correctly receive the downlink data sent by the base station, the terminal may send the NACK information to the base station. The base station may divide the plurality of scheduling subframes into the first subframe set and the second subframe set based on the ACK/NACK information of the plurality of scheduled terminals.

Optionally, in some embodiments, that the base station obtains the ACK/NACK information that is of the terminal and that is based on the scheduling subframe may be specifically: obtaining, by the base station, ACK/NACK information that is sent by the terminal based on data on a code word 0 of the scheduling subframe, so as to divide the plurality of scheduling subframes into the first subframe set and the second subframe set.

Optionally, in some embodiments, that the base station obtains the ACK/NACK information that is of the terminal and that is based on the scheduling subframe may alternatively be specifically: obtaining, by the base station, ACK/NACK information that is sent by the terminal based on data on a code word 1 of the scheduling subframe, so as to divide the plurality of scheduling subframes into the first subframe set and the second subframe set. However, the present invention is not limited thereto. Optionally, in some embodiments, the dividing, by the base station, the plurality of scheduling subframes into the first subframe set and the second subframe set based on the ACK/NACK information of the plurality of scheduled terminals may include:

counting, by the base station, quantities of ACKs and NACKs corresponding to each of the plurality of scheduling subframes within a preset time; and putting a scheduling subframe into the first subframe set when a quantity of ACKs of the scheduling subframe is greater than or equal to a quantity of NACKs of the scheduling subframe; or putting a scheduling subframe into the second subframe set when a quantity of ACKs of the scheduling subframe is less than a quantity of NACKs of the scheduling subframe.

Optionally, in some embodiments, the dividing, by the base station, the plurality of scheduling subframes into the first subframe set and the second subframe set based on the ACK/NACK information of the plurality of scheduled terminals may further include:

collecting, by the base station, statistics about a BLER of each of the plurality of scheduling subframes based on the ACK/NACK information of the plurality of scheduled terminals; and dividing, by the base station, the plurality of scheduling subframes into the first subframe set and the second subframe set based on the BLER of each of the plurality of scheduling subframes.

It should be understood that, in this embodiment of the present invention, each of the plurality of scheduling subframes is used by a scheduled terminal to perform downlink data transmission, and the scheduling subframe may be one subframe or a group of subframes. This is not limited in the present invention. If each scheduling subframe represents a group of subframes, the BLER of each scheduling subframe may be a BLER of the group of subframes.

Optionally, in some embodiments, the dividing, by the base station, the plurality of scheduling subframes into the first subframe set and the second subframe set based on the BLER of each of the plurality of scheduling subframes may include:

dividing, by the base station, the plurality of scheduling subframes into a plurality of subframe groups; and dividing, by the base station, the plurality of subframe groups into the first subframe set and the second subframe set based on a BLER of each scheduling subframe in the plurality of subframe groups.

Specifically, in this embodiment of the present invention, the plurality of scheduling subframes may be divided into the plurality of groups of subframes in a plurality of manners. Optionally, in an implementation, the base station may use frame numbers of the plurality of scheduling subframes as data on which a modulo operation is to be performed, to perform a modulo operation, and add, into one group, subframes with a same value obtained after the modulo operation is performed on the frame numbers of the subframes. For example, in this embodiment of the present invention, the base station may obtain an integer multiple of a long discontinuous reception (Discontinuous Reception, DRX) cycle as a modulus to perform a modulo operation on a subframe number.

Specifically, in this embodiment of the present invention, the base station may obtain a subframe number n of a scheduling subframe and a frame number N of a radio frame in which the scheduling subframe is located, and the base station may calculate, by using the following formula, data M on which a modulo operation is to be performed and that is of the scheduling subframe:

$$M=N*10+n$$

The base station may use a long DRX cycle as a modulus. For example, the long DRX cycle is generally configured as 40 ms. The base station may use 40 as the modulus herein. The base station may use data on which a modulo operation is to be performed and that is of the plurality of scheduling subframes modulo 40, so as to add subframes with a same value obtained after the modulo operation into one group of subframes.

It should be understood that, in this embodiment of the present invention, dividing the plurality of scheduling subframes into the plurality of subframe groups by performing the modulo operation is merely a specific implementation of the present invention, but the present invention is not limited thereto.

Optionally, in some embodiments, the base station may collect statistics about the BLER of each of the plurality of scheduling subframes by using the following formula:

$$Bler(i) = \frac{N_{NACK}(i) + N_{DTX}(i)}{N_{NACK}(i) + N_{DTX}(i) + N_{ACK}(i)}$$

where BLER (i) represents a BLER of an $i^{th}$ subframe in the plurality of scheduling subframes within a preset time; $N_{NACK}(i)$ represents a quantity of NACKs that are fed back by a terminal within the preset time based on downlink data transmitted in the $i^{th}$ subframe; $N_{ACK}(i)$ represents a quantity of ACKs that are fed back by the terminal within the preset time based on the downlink data transmitted in the $i^{th}$ subframe; and $N_{DTX}(i)$ represents a quantity of discontinuous transmission DTX states in which no signal is sent by the terminal in the $i^{th}$ subframe within the preset time.

Optionally, in some embodiments, the base station may alternatively collect statistics about a BLER of each group of subframes of the plurality of scheduling subframes by using the following formula:

$$Bler(i) = \frac{N_{NACK}(i)}{N_{NACK}(i) + N_{DTX}(i) + N_{ACK}(i)}$$

where BLER (i) represents a BLER of an $i^{th}$ subframe in the plurality of scheduling subframes within a preset time; $N_{NACK}(i)$ represents a quantity of NACKs that are fed back by a terminal within the preset time based on downlink data transmitted in the $i^{th}$ subframe; $N_{ACK}(i)$ represents a quantity of ACKs that are fed back by the terminal within the preset time based on the downlink data transmitted in the $i^{th}$ subframe; and $N_{DTX}(i)$ represents a quantity of discontinuous transmission DTX states in which no signal is sent by the terminal in the $i^{th}$ subframe within the preset time.

Optionally, in some embodiments, the dividing, by the base station, the plurality of scheduling subframes into the first subframe set and the second subframe set based on the BLER of each of the plurality of scheduling subframes includes:

when an adjustment moment arrives, obtaining, by the base station, a BLER of each of the plurality of scheduling subframes prior to the adjustment moment; and adjusting, by the base station based on the BLER of each of the plurality of scheduling subframes prior to the adjustment moment, subframes in a first subframe set and a second subframe set prior to the adjustment moment, to obtain the first subframe set and the second subframe set.

Specifically, in this embodiment of the present invention, the base station may collect statistics about the BLER of each of the plurality of scheduling subframes prior to the adjustment moment within an adjustment period prior to the adjustment moment; and when the adjustment moment arrives, the base station may adjust, based on the BLER of each of the plurality of scheduling subframes prior to the adjustment moment, the subframes in the first subframe set and the second subframe set prior to the adjustment moment, to obtain the first subframe set and the second subframe set.

Optionally, in some embodiments, the base station collects statistics about the BLER of each scheduling subframe within the adjustment period prior to the adjustment moment, and the adjustment period may be related to a quantity of large-packet user terminals (or referred to as large-packet users) in data transmission with the base station. For example, in this embodiment of the present invention, the base station determines that the adjustment period of collecting statistics about the BLER of each subframe may be a time parameter multiplied by the quantity of large-packet users, where the time parameter may be 320 ms. The adjustment period between the first subframe set and the second subframe set may be related to the quantity of large-packet user terminals, and the adjustment period may be selected by using the following principle: When the base station performs data transmission with a plurality of large-packet user terminals, it is ensured that the terminals send sufficient ACK/NACK information based on the plurality of scheduling subframes, so that the block error rate of each divided subframe with the adjustment period prior to the adjustment moment is more accurate.

Optionally, in some embodiments, the first subframe set prior to the adjustment moment includes a first scheduling subframe, and the adjusting, by the base station based on the BLER of each of the plurality of scheduling subframes prior to the adjustment moment, subframes in a first subframe set and a second subframe set prior to the adjustment moment, to obtain the first subframe set and the second subframe set includes:

when the adjustment moment arrives, obtaining, by the base station, a BLER of the first subframe set prior to the adjustment moment; and if the BLER of the first subframe set prior to the adjustment moment is greater than a first threshold and a BLER of the first subframe in the first subframe set prior to the adjustment moment is greater than a second threshold, changing, by the base station at the adjustment moment, the first scheduling subframe from the first subframe set prior to the adjustment moment to the second subframe set prior to the adjustment moment, to obtain the first subframe set and the second subframe set.

It should be understood that, in this embodiment of the present invention, within the adjustment period before the adjustment moment arrives, the first subframe set may include the first scheduling subframe. When the adjustment moment arrives, the base station may obtain the BLER of the first subframe set within the adjustment period prior to the adjustment moment.

Optionally, in some embodiments, the plurality of scheduling subframes are divided into the plurality of subframe groups, and the first subframe set may include a first subframe group within the adjustment period prior to the adjustment moment. When the adjustment moment arrives, the base station may obtain the first subframe group and a BLER of the first subframe set. For a specific calculation method of the BLER, refer to the foregoing calculation method of the BLER of each scheduling subframe within the preset time. In this case, the preset time may be the adjustment period.

It should be understood that, in this embodiment of the present invention, the BLER of the first subframe set may be an average value of BLERs of a plurality of subframe groups included in the first subframe set, and a BLER of the second subframe set may be an average value of BLERs of a plurality of subframe groups included in the second subframe set. Certainly, the base station may alternatively obtain the BLER of the first subframe set and the BLER of the second subframe set by using another implementation. For example, the base station may directly collect statistics about the BLER of the first subframe set within the adjustment period prior to the adjustment moment and/or the BLER of the second subframe set within the adjustment period prior to the adjustment moment based on the ACK/NACK information sent by the terminals. A specific statistical method may be the same as the method for collecting statistics about the BLER of each group of subframes. This is not limited in the present invention.

It should be understood that, as described above, the base station may divide the plurality of scheduling subframes into the first subframe set and the second subframe set, and the plurality of scheduling subframes may be divided into the plurality of subframe groups. Therefore, in this embodiment of the present invention, the first subframe set may include some subframe groups in the plurality of subframe groups, and the second subframe set may include the other subframe groups in the plurality of subframe groups. For example, in this embodiment of the present invention, the plurality of scheduling subframes may be divided into 40 groups of subframes, the first subframe set may include 19 groups of subframes in the 40 groups of subframes, and the second subframe set may include the other 21 groups of subframes in the 40 groups of subframes.

Specifically, in this embodiment of the present invention, the BLER of the first subframe set within the adjustment period prior to the adjustment moment is greater than the first threshold, where the first threshold may be a target BLER+5%, and the target BLER may be a value preset by the base station. For example, in this embodiment of the present invention, the target BLER may be 10%. The BLER of the first subframe within the adjustment period prior to the adjustment moment is greater than the second threshold, where the second threshold may be 30%, but the present invention is not limited thereto. Therefore, in a possible implementation, in this embodiment of the present invention, when the base station finds through statistics that the BLER of the first subframe set within the adjustment period prior to the adjustment moment is greater than 15%, and that the BLER of the first subframe in the first subframe set within the adjustment period prior to the adjustment moment is greater than 30%, the base station may change the first scheduling subframe from the first subframe set within the adjustment period prior to the adjustment moment to the second subframe set within the adjustment period prior to the adjustment moment.

Optionally, in some embodiments, the BLER of the first subframe set within the adjustment period prior to the adjustment moment is greater than the first threshold, and there may be a plurality of first subframes whose BLERs within the adjustment period prior to the adjustment moment are greater than the second threshold. For example, in the first subframe set, there may be four subframes whose BLERs are all greater than the second threshold. In this case, the base station may limit a quantity of the plurality of subframes that meet the BLER condition. For example, when there are four subframes whose BLERs are all greater than the second threshold in the first subframe set, the base station changes only two of the subframes from the first subframe set within the adjustment period prior to the adjustment moment to the second subframe set. In a specific implementation, as described above, when the plurality of scheduling subframes are divided into 40 subframe groups, where the 40 subframe groups may be obtained through division based on a modulo operation, and values obtained after subframe numbers of subframes in each group of subframes modulo 40 are the same, the base station may determine, based on order of sizes of values after the modulo operation, two groups of subframes from the four subframe groups meeting the BLER condition, and change the two groups of subframes from the first subframe set to the second subframe set. For example, a total of three subframe groups with values of 3, 4, and 7 after the modulo operation meet the BLER adjustment condition, and the base station may change two subframe groups with modulo result values of 3 and 4 from the first subframe set within the adjustment period prior to the adjustment moment to the second subframe set.

Optionally, in some embodiments, a quantity of scheduling subframes included in the first subframe set is not less a fifth threshold. In a specific implementation, as described above, when the plurality of scheduling subframes are divided into 40 subframe groups, where the 40 subframe groups may be obtained through division based on a modulo operation, and values obtained after subframe numbers of subframes in each group of subframes modulo 40 are the same, when the base station changes subframes in a first group of subframes meeting the condition from the first subframe to the second subframe set, it needs to be ensured that a quantity of remaining subframe groups in the first subframe set is greater than or equal to 10. When the quantity of remaining subframe groups in the first subframe set is less than 10, even if the first subframe set includes the first subframe group meeting the BLER adjustment condition, the first group of subframes meeting the condition are not allowed to be changed from the first subframe set to the second subframe set. It should be understood that setting the fifth threshold to 10 is merely a specific implementation. The present invention is not limited thereto.

Optionally, in some embodiments, the second subframe set prior to the adjustment moment includes a second scheduling subframe, and the adjusting, by the base station based on the BLER of each of the plurality of scheduling subframes prior to the adjustment moment, subframes in a first subframe set and a second subframe set prior to the adjustment moment, to obtain the first subframe set and the second subframe set includes:

when the adjustment moment arrives, obtaining, by the base station, a BLER of the second subframe set prior to the adjustment moment; and if the BLER of the second subframe set prior to the adjustment moment is greater than a third threshold and a BLER of a second subframe in the second subframe set prior to the adjustment moment is less than or equal to a fourth threshold, changing, by the base station at the adjustment moment, the second scheduling subframe from the second subframe set prior to the adjustment moment to the first subframe set prior to the adjustment moment, to obtain the first subframe set and the second subframe set.

It should be understood that, in this embodiment of the present invention, a manner in which the base station obtains the BLER of the second subframe set prior to the adjustment moment may be the same as that in which the base station obtains the BLER of the first subframe set prior to the adjustment moment. This is not limited in the present invention.

Specifically, in this embodiment of the present invention, the BLER of the second subframe set prior to the adjustment moment is greater than the third threshold, where the third threshold may be a target BLER−5%, and the target BLER may be a value preset by the base station. For example, in this embodiment of the present invention, the target BLER may be 10%. The BLER of the second subframe in the second subframe set prior to the adjustment moment is less than or equal to the fourth threshold, where the fourth threshold may be 0, but the present invention is not limited thereto. Therefore, in a possible implementation, in this embodiment of the present invention, when the base station finds through statistics that the BLER of the second subframe set within a previous adjustment period prior to the adjustment moment is greater than 5%, and that the BLER of the second subframe in the second subframe set prior to the adjustment moment is 0, the base station may change the second subframe from the second scheduling subframe set prior to the adjustment moment to the first subframe set prior to the adjustment moment, to obtain the first subframe set and the second subframe set.

Optionally, in some embodiments, the BLER of the second subframe set prior to the adjustment moment is greater than the third threshold, and there may be a plurality of second subframes whose BLERs are greater than the fourth threshold in the second subframe set prior to the adjustment moment. For example, in the second subframe set prior to the adjustment moment, there may be four subframes whose BLERs are all less than or equal to the fourth threshold. In this case, the base station may limit a quantity of the plurality of scheduling subframes that meet the BLER condition. For example, when there are four scheduling subframes whose BLERs are all less than or equal to the fourth threshold in the second subframe set prior to the adjustment moment, the base station may change only one of the scheduling subframes from the second subframe set prior to the adjustment moment to the first subframe set prior to the adjustment moment. In a specific implementation, the base station may divide the plurality of scheduling subframes into 40 groups of subframes based on a modulo operation, where values obtained after subframe numbers in each group of subframes modulo 40 are the same. The base station may determine, based on order of sizes of values after the modulo operation, a subframe group whose BLER is 0 from the four subframe groups meeting the BLER condition, and change scheduling subframes in the subframe group from the second subframe set prior to the adjustment moment to the first subframe set, to obtain the first subframe set and the second subframe set.

Optionally, in some embodiments, within the adjustment period prior to the adjustment moment, a quantity of hybrid automatic repeat requests (Hybrid Automatic Repeat Request, HARQ) that are fed back by the terminal after the terminal transmits downlink data based on the first scheduling subframe or the second scheduling subframe is greater than the fifth threshold. For example, the quantity of HARQs that are fed back by the terminal after the terminal transmits the downlink data based on the first scheduling subframe or the second scheduling subframe may be greater than 4. To be specific, when the quantity of HARQs that are fed back by the terminal based on the first scheduling subframe or the second scheduling subframe is greater than 4, the BLER that is of the first scheduling subframe or the second scheduling subframe and that is obtained by the base station through statistics based on the ACK/NACK information fed back by the scheduled terminal may be a valid BLER. In this case, the base station may change a set to which the first scheduling subframe or the second scheduling subframe meeting the BLER condition belongs.

Figure 4:
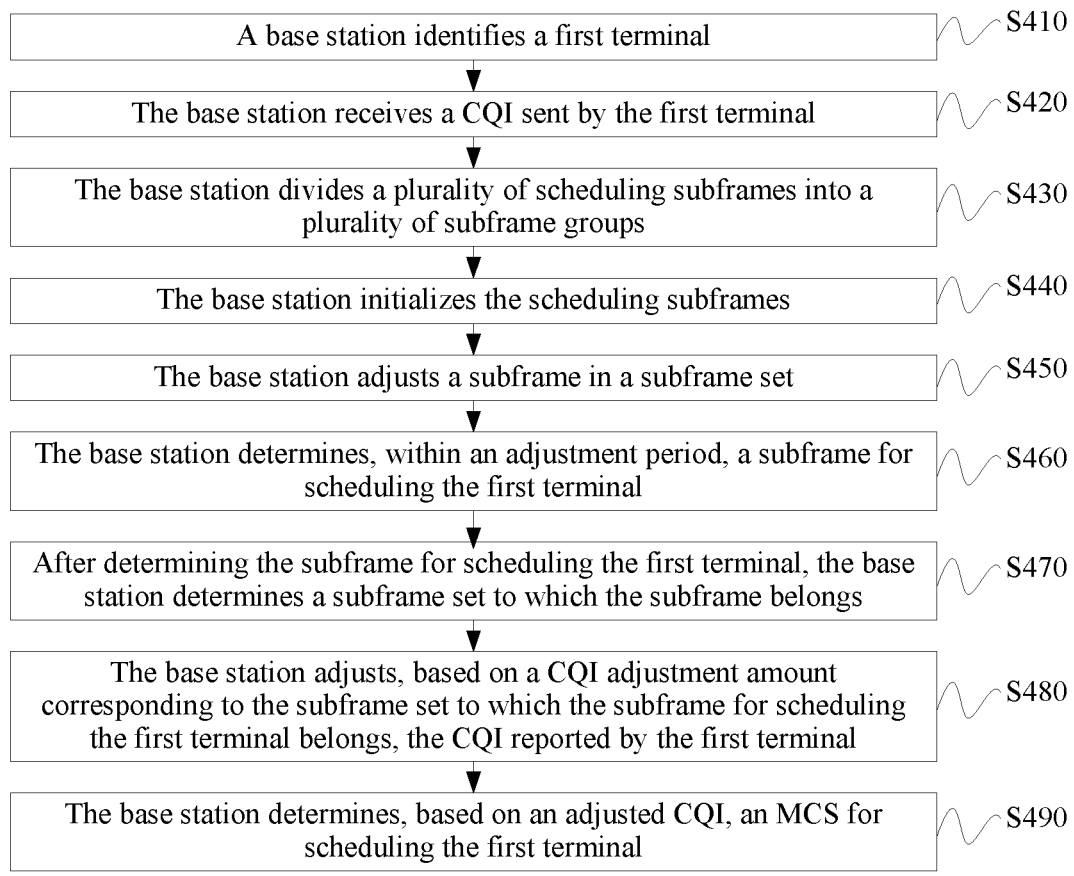
FIG. 4 is a detailed flowchart of an adaptive modulation and coding method according to another embodiment of the present invention.

FIG. 4 describes specific steps or operations of an adaptive modulation and coding method in an embodiment of the present invention in detail. In this embodiment of the present invention, these steps or operations are merely examples. There may be other operations that can be performed in this embodiment of the present invention, or variants of the operations in FIG. 4. In addition, the steps in FIG. 4 may be performed in a sequence different from that shown in FIG. 4, and it is possible that not all the operations in FIG. 4 need to be performed. It should be understood that the following detailed description is merely intended to help a person skilled in the art to better understand the embodiments of the present invention, and should not be construed as any limitation to the scope of the embodiments of the present invention.

The following describes the specific steps of the adaptive modulation and coding method in this embodiment of the present invention in detail with reference to FIG. 4.

S410. A base station identifies a first terminal.

In this embodiment of the present invention, the base station may identify the first terminal based on an amount of data that is received by a terminal and reaches radio link control (Radio Link Control, RLC) per second.

In a specific implementation, the base station may set a preset threshold for the amount of data that is received by the terminal and reaches radio link control per second. When the amount of data that is received by the terminal and reaches radio link control per second exceeds the preset threshold, the terminal may be identified as the first terminal. For example, in this embodiment of the present invention, if a to-be-transmitted data amount is 0, and the amount of data that is received by the terminal and reaches radio link control per second is greater than 1250000 bytes, the base station may identify the terminal as the first terminal. If a to-be-transmitted data amount is not 0, and the amount of data that is received by the terminal and reaches radio link control per second is greater than Min{the to-be-transmitted data amount*1000/8 bytes, 1250000 bytes}, the base station may identify the terminal as the first terminal. Therefore, the first terminal may also be referred to as a terminal of a large-packet user.

It should be understood that the first terminal is a terminal of which an amount of data received and reaching RLC per second is greater than the preset threshold. Therefore, when communicating with the base station, the first terminal is online for a long time and is scheduled for many times. According to the technical solution of the present invention, a higher throughput gain can be obtained, but the present invention is not limited thereto.

It should further be understood that, in this embodiment of the present invention, there may be a plurality of first terminals.

It should further be understood that, in this embodiment of the present invention, the first terminal is only a terminal of which an amount of data reaching RLC per second is greater than the preset threshold. To be specific, within a time period, a terminal 1 meets a condition that the amount of data reaching RLC per second is greater than the preset threshold, and therefore the terminal 1 may be the first terminal. However, within another time period, the terminal 1 does not meet the condition that the amount of data reaching RLC per second is greater than the preset threshold, and therefore the No. 1 terminal is not the first terminal.

S420. The base station receives a CQI sent by the first terminal.

S430. The base station divides a plurality of scheduling subframes into a plurality of subframe groups.

Specifically, the base station may group the plurality of scheduling subframes within an adjustment period based on a modulo operation. In a specific implementation, in this embodiment of the present invention, the base station may use 40 as a modulus to perform a modulo operation for the scheduling subframes, and add subframes corresponding to subframe numbers with a same modulo result value to one group, so that 40 subframe groups can be obtained. Each group of subframes in the 40 subframe groups may include at least one scheduling subframe.

Further, after the base station determines a subframe for scheduling the first terminal, the base station can obtain, by a subframe number of the subframe modulo 40, a subframe group to which the subframe belongs. For a specific modulo algorithm, refer to the foregoing description.

S440. The base station initializes the scheduling subframes.

In this step, the base station may initialize all of the 40 subframe groups obtained through division in S430 to a first subframe set. In this case, a second subframe set may be an empty set. It should be understood that, in this embodiment of the present invention, the first subframe set may also be referred to as a low-interference subframe set, and the second subframe set may also be referred to as a high-interference subframe set.

It should be understood that, in this embodiment of the present invention, after initialization, the base station divides the plurality of scheduling subframes into the first subframe set and the second subframe set, and the first subframe set and the second subframe set correspond to different CQI adjustment amounts. In an implementation, after initialization, a CQI adjustment amount of the first subframe set may be initialized by using an original CQI adjustment amount, and a CQI adjustment amount corresponding to the second subframe set may be initialized to 0.

S450. The base station adjusts a subframe in a subframe set.

In this step, the base station may determine an adjustment period of the subframe in the subframe set, and the adjustment period may be a time parameter multiplied by a quantity of first terminals. The adjustment period varies with the quantity of first terminals, and it can be ensured that the first terminal has sufficient ACK/NACK feedback information based on the scheduling subframes. For example, the time parameter may be 320 ms. When the base station performs data transmission with one first terminal, the adjustment period may be 320 ms. When the base station performs data transmission with two first terminals, the adjustment period may be 640 ms.

In this step, before an adjustment moment arrives, the base station continuously collects statistics about ACK/NACK information fed back by the terminal after the terminal transmits data based on each scheduling subframe, so that BLERs of the 40 subframe groups within the adjustment period prior to the adjustment moment can be obtained, and BLERs of the first subframe set and the second subframe set within the adjustment period prior to the adjustment moment can also be obtained. A specific calculation method of a BLER of each scheduling subframe is described above. For brevity of the application document, details are not described herein again.

It should be understood that, in this embodiment of the present invention, dividing the plurality of scheduling subframes into the 40 subframe groups is merely a specific implementation of the present invention. A calculation method of a BLER of each of the 40 subframe groups and the BLERs of the first subframe set and the second subframe set may be the same as the calculation method of the BLER of each scheduling subframe. In other words, during calculation of a BLER of each subframe group or a subframe set in which a subframe group is located, statistics about ACK/NACK information fed back by all terminals in the subframe group or the subframe set based on a scheduling subframe may also be collected, so as to calculate and obtain the BLER of the subframe group or the subframe set.

When the adjustment moment arrives, if the BLER of the first subframe set is greater than a target BLER+5%, a subframe group whose BLER is greater than 30% in the first subframe set may be changed from the first subframe set to the second subframe set. If the BLER of the second subframe set is greater than the target BLER−5%, a subframe group whose BLER is 0 in the second subframe set may be changed at the adjustment moment from the second subframe set prior to the adjustment moment to the first subframe set.

Optionally, in some embodiments, when determining to change a subframe set to which a subframe group belongs, the base station may first determine a quantity of HARQs that are fed back by the terminal after the terminal transmits data based on a subframe in the subframe group. When the quantity of HARQs that are fed back by the terminal after the terminal transmits the data based on the subframe in the subframe group is less than or equal to 4, the subframe set to which the subframe group belongs is not allowed to be changed.

Optionally, in some embodiments, the base station may further limit a quantity of subframe groups in the first subframe set. In a specific implementation, at the adjustment moment, when changing a subframe set to which a subframe group belongs, the base station may specify that the quantity of subframe groups in the first subframe set is not less than 10. In other words, when the quantity of subframe groups in the first subframe set is less than 10, the base station may prohibit, at the adjustment moment, changing the subframe group in the first subframe set to the second subframe set.

Optionally, in some embodiments, the base station may further limit a quantity of subframe groups to be changed from the first subframe set to the second subframe set. For example, at the adjustment moment, the base station may allow only two subframe groups meeting a BLER condition in the first subframe set to be changed to the second subframe set. Certainly, the base station may also limit a quantity of subframe groups to be changed from the second subframe set to the first subframe set. For example, at the adjustment moment, the base station may allow only one subframe group meeting a BLER condition to be changed to the first subframe set.

S460. The base station determines, within an adjustment period, a subframe for scheduling the first terminal.

S470. After determining the subframe for scheduling the first terminal, the base station determines a subframe set to which the subframe belongs.

Specifically, the base station may use a subframe number of the subframe for scheduling the first terminal and a frame number of a frame in which the subframe is located, to obtain, by using the following formula, data on which a modulo operation is to be performed: M=10*N+n.

The base station determines, based on the data on which a modulo operation is to be performed modulo 40 and a value obtained after the modulo operation, a subframe group in which the subframe is located. For example, if the base station determines that the subframe number of the subframe for scheduling the first terminal is 9, and the frame number of the frame in which the subframe is located is 9, the value obtained after the base station performs the modulo operation is 19. Therefore, the base station may determine that the subframe is a subframe in a nineteenth subframe group.

After the base station determines that the subframe is the subframe in the nineteenth subframe group, the base station may determine that the nineteenth subframe group is the first subframe set within a current adjustment period. It should be understood that the nineteenth subframe group to which the subframe belongs may also be the second subframe set within the current period. This is merely an example herein for description in this embodiment of the present invention.

S480. The base station adjusts, based on a CQI adjustment amount corresponding to the subframe set to which the subframe for scheduling the first terminal belongs, the CQI reported by the first terminal.

S490. The base station determines, based on an adjusted CQI, an MCS for scheduling the first terminal.

Optionally, in some embodiments, the base station may adjust, based on ACK/NACK information sent by the first terminal based on the subframe for scheduling the first terminal, the CQI adjustment amount corresponding to the subframe set to which the subframe for scheduling the first terminal belongs.

Figure 5:
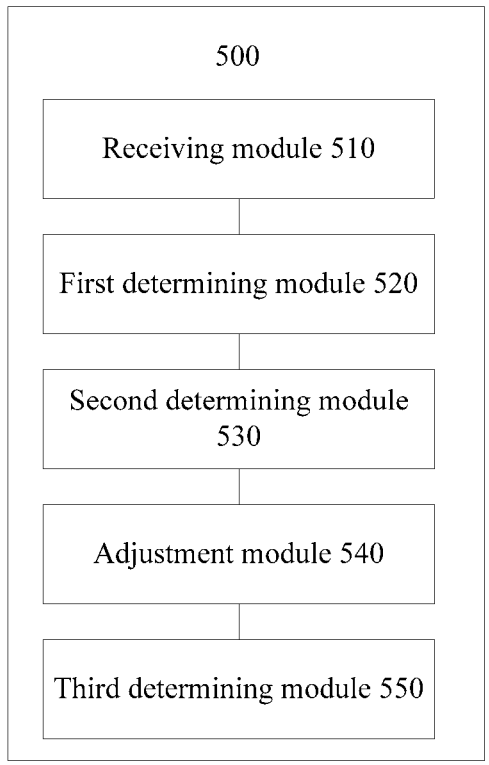
FIG. 5 is a schematic block diagram of a base station according to an embodiment of the present invention.

The foregoing describes the method embodiments of adaptive modulation and coding in detail, and the following describes base station embodiments of adaptive modulation and coding in the embodiments of the present invention in detail. FIG. 5 is a schematic structural diagram of a base station 500 according to an embodiment of the present invention. The base station 500 in FIG. 5 includes a receiving module 510, a first determining module 520, a second determining module 530, an adjustment module 540, and a third determining module 550.

The receiving module 510 is configured to receive a channel quality indicator CQI sent by a first terminal.

The first determining module 520 is configured to determine a subframe for scheduling the first terminal.

The second determining module 530 is configured to determine a subframe set to which the subframe belongs, where the subframe set is a first subframe set or a second subframe set, and the first subframe set and the second subframe set correspond to different CQI adjustment amounts.

The adjustment module 540 is configured to adjust the CQI based on a CQI adjustment amount corresponding to the subframe set to which the subframe belongs.

The third determining module 550 is configured to determine, based on an adjusted CQI, a modulation and coding scheme MCS for scheduling the first terminal.

In this application, after the base station determines the subframe for scheduling the first terminal, the base station may determine the subframe set to which the subframe belongs, where the subframe set may be the first subframe set or the second subframe set; and then adjusts, based on the CQI adjustment amount corresponding to the subframe set, the CQI sent by the first terminal. In this way, a waste of a high signal-to-noise ratio of a low-interference subframe caused by using only one set of CQI adjustment amount in the prior art is avoided. Therefore, in this embodiment of the present invention, the base station can efficiently use the high signal-to-noise ratio of the low-interference subframe in a current cell, thereby improving transmission efficiency of downlink data and a throughput of the current cell.

Optionally, in some embodiments, the CQI may further include an MCS recommended by the first terminal.

Optionally, in some embodiments, the base station may alternatively obtain an MCS based on a preset table of mapping between a CQI and an MCS.

Optionally, in some embodiments, when the base station performs downlink data transmission with the first terminal, downlink data may be large-packet user data, but the present invention is not limited thereto. It should be understood that, in this embodiment of the present invention, a large-packet user is online for a long time and is scheduled for many times during downlink data transmission. Therefore, a higher throughput gain can be obtained by using the technical solution in this embodiment of the present invention.

Optionally, in some embodiments, the first subframe set and the second subframe set may be sets that are obtained through division in advance.

Optionally, in some embodiments, the first subframe set and the second subframe set may be divided based on an adjustment period. When the adjustment period arrives, the base station may re-divide the first subframe set and the second subframe set. A method for dividing, by the base station, a plurality of scheduling subframes into the first subframe set and the second subframe set has been described in detail in the method embodiments. Details are not described herein again.

Optionally, in some embodiments, the base station may adjust, based on ACK/NACK information sent by the first terminal based on the subframe for scheduling the first terminal, the CQI adjustment amount corresponding to the subframe set to which the subframe for scheduling the first terminal belongs.

Optionally, in some embodiments, the base station for adaptive modulation and coding in this embodiment of the present invention may further include:

a division module, configured to divide the plurality of scheduling subframes into the first subframe set and the second subframe set.

Optionally, in some embodiments, the division module may divide, based on a data bearer state of a subframe in a neighboring cell of a serving cell for scheduling the first terminal, the plurality of scheduling subframes in the serving cell into the first subframe set and the second subframe set. Alternatively, the base station may divide the plurality of scheduling subframes in a serving cell into the first subframe set and the second subframe set based on a level of interference of each subframe in a neighboring cell to the serving cell.

Optionally, in some embodiments, the base station may further include:

an obtaining module, configured to obtain acknowledgement ACK/negative acknowledgement NACK information of a plurality of scheduled terminals.

The division module is specifically configured to divide the plurality of scheduling subframes into the first subframe set and the second subframe set based on the ACK/NACK information of the plurality of scheduled terminals.

Optionally, in some embodiments, the base station may further include:

a statistics collecting module, configured to collect statistics about a block error rate BLER of each of the plurality of scheduling subframes based on the ACK/NACK information of the plurality of scheduled terminals.

The division module is specifically configured to divide the plurality of scheduling subframes into the first subframe set and the second subframe set based on the BLER of each of the plurality of scheduling subframes.

Optionally, in some embodiments, the statistics collecting module is specifically configured to:

collect statistics about the BLER of each of the plurality of scheduling subframes by using the following formula:

$$Bler(i) = \frac{N_{NACK}(i) + N_{DTX}(i)}{N_{NACK}(i) + N_{DTX}(i) + N_{ACK}(i)}$$

where BLER (i) represents a BLER of an $i^{th}$ subframe in the plurality of scheduling subframes within a preset time; $N_{NACK}(i)$ represents a quantity of NACKs that are fed back by a terminal within the preset time based on downlink data transmitted in the $i^{th}$ subframe; $N_{ACK}(i)$ represents a quantity of ACKs that are fed back by the terminal within the preset time based on the downlink data transmitted in the $i^{th}$ subframe; and $N_{DTX}(i)$ represents a quantity of discontinuous transmission DTX states in which no signal is sent by the terminal in the $i^{th}$ subframe within the preset time.

Optionally, in some embodiments, the statistics collecting module is specifically configured to:

collect statistics about the BLER of each of the plurality of scheduling subframes by using the following formula:

$$Bler(i) = \frac{N_{NACK}(i)}{N_{NACK}(i) + N_{DTX}(i) + N_{ACK}(i)}$$

where BLER (i) represents a BLER of an $i^{th}$ subframe in the plurality of scheduling subframes within a preset time; $N_{NACK}(i)$ represents a quantity of NACKs that are fed back by a terminal within the preset time based on downlink data transmitted in the $i^{th}$ subframe; $N_{ACK}(i)$ represents a quantity of ACKs that are fed back by the terminal within the preset time based on the downlink data transmitted in the $i^{th}$ subframe; and $N_{DTX}(i)$ represents a quantity of discontinuous transmission DTX states in which no signal is sent by the terminal in the $i^{th}$ subframe within the preset time.

Optionally, in some embodiments, the obtaining module of the base station is further configured to:

when an adjustment moment arrives, obtain a BLER of each of the plurality of scheduling subframes prior to the adjustment moment.

The division module is specifically configured to adjust, based on the BLER of each of the plurality of scheduling subframes prior to the adjustment moment, subframes in a first subframe set and a second subframe set prior to the adjustment moment, to obtain the first subframe set and the second subframe set.

Optionally, in some embodiments, the base station collects statistics about the BLER of each scheduling subframe within the adjustment period prior to the adjustment moment, and the adjustment period may be related to a quantity of large-packet users in data transmission with the base station.

Optionally, in some embodiments, the first subframe set prior to the adjustment moment includes a first scheduling subframe, and the obtaining module of the base station is further configured to:

when the adjustment moment arrives, obtain a BLER of the first subframe set prior to the adjustment moment.

The division module is specifically configured to: if the BLER of the first subframe set prior to the adjustment moment is greater than a first threshold and a BLER of the first subframe in the first subframe set prior to the adjustment moment is greater than a second threshold, change, at the adjustment moment, the first scheduling subframe from the first subframe set prior to the adjustment moment to the second subframe set prior to the adjustment moment, to obtain the first subframe set and the second subframe set.

Optionally, in some embodiments, the second subframe set prior to the adjustment moment includes a second scheduling subframe, and the obtaining module of the base station is further configured to:

when the adjustment moment arrives, obtain a BLER of the second subframe set prior to the adjustment moment.

The division module is specifically configured to: if the BLER of the second subframe set prior to the adjustment moment is greater than a third threshold and a BLER of a second subframe in the second subframe set prior to the adjustment moment is less than or equal to a fourth threshold, change, at the adjustment moment, the second subframe from the second scheduling subframe set prior to the adjustment moment to the first subframe set prior to the adjustment moment, to obtain the first subframe set and the second subframe set.

Figure 6:
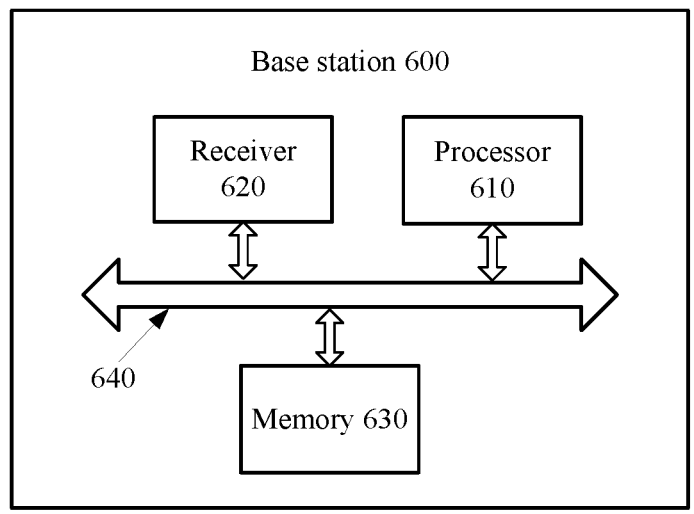
FIG. 6 is a schematic structural diagram of a base station according to another embodiment of the present invention.

FIG. 6 is a schematic block diagram of a base station 600 according to an embodiment of the present invention. The base station 600 shown in FIG. 6 includes a receiver 620, where the receiver 620 may be connected to a processor 610 by using a bus 640. The receiver 620 is configured to receive data or information, and a memory 630 stores an executable instruction. When the base station 600 runs, the processor 610 communicates with the memory 630, and the processor 610 invokes the executable instruction in the memory 630.

The receiver 620 is configured to receive a channel quality indicator CQI sent by a first terminal.

The processor 610 is configured to determine a subframe for scheduling the first terminal.

The processor 610 is further configured to determine a subframe set to which the subframe belongs, where the subframe set is a first subframe set or a second subframe set, and the first subframe set and the second subframe set correspond to different CQI adjustment amounts.

The processor 610 is further configured to adjust the CQI based on a CQI adjustment amount corresponding to the subframe set to which the subframe belongs.

The processor 610 is further configured to determine, based on an adjusted CQI, a modulation and coding scheme MCS for scheduling the first terminal.

In this application, after the base station determines the subframe for scheduling the first terminal, the base station may determine the subframe set to which the subframe belongs, where the subframe set may be the first subframe set or the second subframe set; and then adjusts, based on the CQI adjustment amount corresponding to the subframe set, the CQI sent by the first terminal. In this way, a waste of a high signal-to-noise ratio of a low-interference subframe caused by using only one set of CQI adjustment amount in the prior art is avoided. Therefore, in this embodiment of the present invention, the base station can efficiently use the high signal-to-noise ratio of the low-interference subframe in a current cell, thereby improving transmission efficiency of downlink data and a throughput of the current cell.

Optionally, in some embodiments, the CQI may further include an MCS recommended by the first terminal.

Optionally, in some embodiments, the base station may alternatively obtain an MCS based on a preset table of mapping between a CQI and an MCS.

Optionally, in some embodiments, when the base station performs downlink data transmission with the first terminal, downlink data may be large-packet user data, but the present invention is not limited thereto. It should be understood that, in this embodiment of the present invention, a large-packet user is online for a long time and is scheduled for many times during downlink data transmission. Therefore, a higher throughput gain can be obtained by using the technical solution in this embodiment of the present invention.

Optionally, in some embodiments, the first subframe set and the second subframe set may be sets that are obtained through division in advance.

Optionally, in some embodiments, the first subframe set and the second subframe set may be divided based on an adjustment period. When the adjustment period arrives, the base station may re-divide the first subframe set and the second subframe set. A method for dividing, by the base station, a plurality of scheduling subframes into the first subframe set and the second subframe set has been described in detail in the method embodiments. Details are not described herein again.

Optionally, in some embodiments, the base station may adjust, based on ACK/NACK information sent by the first terminal based on the subframe for scheduling the first terminal, the CQI adjustment amount corresponding to the subframe set to which the subframe for scheduling the first terminal belongs.

Optionally, in some embodiments, the processor 610 is further configured to:

divide the plurality of scheduling subframes into the first subframe set and the second subframe set.

Optionally, in some embodiments, the processor 610 may divide, based on a data bearer state of a subframe in a neighboring cell of a serving cell for scheduling the first terminal, the plurality of scheduling subframes in the serving cell into the first subframe set and the second subframe set. Alternatively, the base station may divide the plurality of scheduling subframes in a serving cell into the first subframe set and the second subframe set based on a level of interference of each subframe in a neighboring cell to the serving cell.

Optionally, in some embodiments, the processor 610 is further configured to obtain acknowledgement ACK/negative acknowledgement NACK information of a plurality of scheduled terminals, and divide the plurality of scheduling subframes into the first subframe set and the second subframe set based on the ACK/NACK information of the plurality of scheduled terminals.

Optionally, in some embodiments, the processor 610 is further configured to: collect statistics about a block error rate BLER of each of the plurality of scheduling subframes based on the ACK/NACK information of the plurality of scheduled terminals; and divide the plurality of scheduling subframes into the first subframe set and the second subframe set based on the BLER of each of the plurality of scheduling subframes.

Optionally, in some embodiments, the processor 610 collects statistics about the BLER of each of the plurality of scheduling subframes by using the following formula:

$$Bler(i) = \frac{N_{NACK}(i) + N_{DTX}(i)}{N_{NACK}(i) + N_{DTX}(i) + N_{ACK}(i)}$$

where BLER (i) represents a BLER of an $i^{th}$ subframe in the plurality of scheduling subframes within a preset time; $N_{NACK}(i)$ represents a quantity of NACKs that are fed back by a terminal within the preset time based on downlink data transmitted in the $i^{th}$ subframe; $N_{ACK}(i)$ represents a quantity of ACKs that are fed back by the terminal within the preset time based on the downlink data transmitted in the $i^{th}$ subframe; and $N_{DTX}(i)$ represents a quantity of discontinuous transmission DTX states in which no signal is sent by the terminal in the $i^{th}$ subframe within the preset time.

Optionally, in some embodiments, the processor 610 collects statistics about the BLER of each of the plurality of scheduling subframes by using the following formula:

$$Bler(i) = \frac{N_{NACK}(i)}{N_{NACK}(i) + N_{DTX}(i) + N_{ACK}(i)}$$

where BLER (i) represents a BLER of an $i^{th}$ subframe in the plurality of scheduling subframes within a preset time; $N_{NACK}$(i) represents a quantity of NACKs that are fed back by a terminal within the preset time based on downlink data transmitted in the $i^{th}$ subframe; $N_{ACK}$(i) represents a quantity of ACKs that are fed back by the terminal within the preset time based on the downlink data transmitted in the $i^{th}$ subframe; and $N_{DTX}$(i) represents a quantity of discontinuous transmission DTX states in which no signal is sent by the terminal in the $i^{th}$ subframe within the preset time.

Optionally, in some embodiments, the processor 610 is further configured to: when an adjustment moment arrives, obtain a BLER of each of the plurality of scheduling subframes prior to the adjustment moment, and adjust, based on the BLER of each of the plurality of scheduling subframes prior to the adjustment moment, subframes in a first subframe set and a second subframe set prior to the adjustment moment, to obtain the first subframe set and the second subframe set.

Optionally, in some embodiments, the base station collects statistics about the BLER of each scheduling subframe within the adjustment period prior to the adjustment moment, and the adjustment period may be related to a quantity of large-packet users in data transmission with the base station.

Optionally, in some embodiments, the first subframe set prior to the adjustment moment includes a first scheduling subframe, and the processor 610 is further configured to:

when the adjustment moment arrives, obtain a BLER of the first subframe set prior to the adjustment moment; and if the BLER of the first subframe set prior to the adjustment moment is greater than a first threshold and a BLER of the first subframe in the first subframe set prior to the adjustment moment is greater than a second threshold, change, at the adjustment moment, the first scheduling subframe from the first subframe set prior to the adjustment moment to the second subframe set prior to the adjustment moment, to obtain the first subframe set and the second subframe set.

Optionally, in some embodiments, the second subframe set prior to the adjustment moment includes a second scheduling subframe, and the processor 610 is further configured to:

when the adjustment moment arrives, obtain a BLER of the second subframe set prior to the adjustment moment; and if the BLER of the second subframe set prior to the adjustment moment is greater than a third threshold and a BLER of a second subframe in the second subframe set prior to the adjustment moment is less than or equal to a fourth threshold, change, at the adjustment moment, the second scheduling subframe from the second subframe set prior to the adjustment moment to the first subframe set prior to the adjustment moment, to obtain the first subframe set and the second subframe set.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An adaptive modulation and coding method, comprising:
   receiving, by a base station, a channel quality indicator (CQI) sent by a first terminal;
   determining, by the base station, a subframe for scheduling the first terminal;
   determining, by the base station, a subframe set to which the subframe belongs, wherein the subframe set is a first subframe set or a second subframe set, and wherein the first subframe set and the second subframe set correspond to different CQI adjustment amounts;

dividing, by the base station, a plurality of scheduling subframes into the first subframe set and the second subframe set, wherein dividing the plurality of scheduling subframes into the first subframe set and the second subframe set comprises:
obtaining, by the base station, acknowledgement (ACK)/negative acknowledgement (NACK) (ACK/NACK) information of a plurality of scheduled terminals; and
dividing, by the base station, the plurality of scheduling subframes into the first subframe set and the second subframe set based on the ACK/NACK information of the plurality of scheduled terminals;

adjusting, by the base station, the CQI based on a CQI adjustment amount corresponding to the subframe set to which the subframe belongs; and determining, by the base station based on an adjusted CQI, a modulation and coding scheme (MCS) for scheduling the first terminal.

2. The method according to claim 1, wherein the dividing, by the base station, the plurality of scheduling subframes into the first subframe set and the second subframe set based on the ACK/NACK information of the plurality of scheduled terminals comprises:
collecting, by the base station, statistics about a block error rate (BLER) of each of the plurality of scheduling subframes based on the ACK/NACK information of the plurality of scheduled terminals; and
dividing, by the base station, the plurality of scheduling subframes into the first subframe set and the second subframe set based on the BLER of each of the plurality of scheduling subframes.

3. The method according to claim 2, wherein the dividing, by the base station, the plurality of scheduling subframes into the first subframe set and the second subframe set based on the BLER of each of the plurality of scheduling subframes comprises:
when an adjustment moment arrives, obtaining, by the base station, a BLER of each of the plurality of scheduling subframes prior to the adjustment moment; and
adjusting, by the base station based on the BLER of each of the plurality of scheduling subframes prior to the adjustment moment, subframes in a first subframe set and a second subframe set prior to the adjustment moment to obtain the first subframe set and the second subframe set.

4. The method according to claim 3, wherein the first subframe set prior to the adjustment moment comprises a first scheduling subframe, and wherein the adjusting, by the base station based on the BLER of each of the plurality of scheduling subframes prior to the adjustment moment, subframes in a first subframe set and a second subframe set prior to the adjustment moment, to obtain the first subframe set and the second subframe set comprises:
when the adjustment moment arrives, obtaining, by the base station, a BLER of the first subframe set prior to the adjustment moment; and
if the BLER of the first subframe set prior to the adjustment moment is greater than a first threshold and a BLER of a first subframe in the first subframe set prior to the adjustment moment is greater than a second threshold, changing, by the base station at the adjustment moment, the first scheduling subframe from the first subframe set prior to the adjustment moment to the second subframe set prior to the adjustment moment to obtain the first subframe set and the second subframe set.

5. The method according to claim 4, wherein the second subframe set prior to the adjustment moment comprises a second scheduling subframe, and wherein the adjusting, by the base station based on the BLER of each of the plurality of scheduling subframes prior to the adjustment moment, subframes in a first subframe set and a second subframe set prior to the adjustment moment, to obtain the first subframe set and the second subframe set comprises:
when the adjustment moment arrives, obtaining, by the base station, a BLER of the second subframe set prior to the adjustment moment; and
if the BLER of the second subframe set prior to the adjustment moment is greater than a third threshold and a BLER of a second subframe in the second subframe set prior to the adjustment moment is less than or equal to a fourth threshold, changing, by the base station at the adjustment moment, the second scheduling subframe from the second subframe set prior to the adjustment moment to the first subframe set prior to the adjustment moment to obtain the first subframe set and the second subframe set.

6. The method according to claim 2, wherein the collecting, by the base station, statistics about a block error rate (BLER) of each of the plurality of scheduling subframes based on the ACK/NACK information of the plurality of scheduled terminals comprises:
collecting, by the base station, statistics about the BLER of each of the plurality of scheduling subframes by using the following formula:

$$Bler(i) = \frac{N_{NACK}(i) + N_{DTX}(i)}{N_{NACK}(i) + N_{DTX}(i) + N_{ACK}(i)}$$

wherein:
BLER (i) represents a BLER of an $i^{th}$ subframe in the plurality of scheduling subframes within a preset time;
$N_{NACK}(i)$ represents a quantity of NACKs that are fed back by a terminal within the preset time based on downlink data transmitted in the $i^{th}$ subframe;
$N_{ACK}(i)$ represents a quantity of ACKs that are fed back by the terminal within the preset time based on the downlink data transmitted in the $i^{th}$ subframe; and
$N_{DTX}(i)$ represents a quantity of discontinuous transmission DTX states in which no signal is sent by the terminal in the $i^{th}$ subframe within the preset time.

7. The method according to claim 1, wherein the first terminal is a terminal of which an amount of data received and reaching radio link control (RLC) per second is greater than a preset threshold.

8. A base station, comprising:
a receiver, the receiver configured to receive a channel quality indicator (CQI) sent by a first terminal;
at least one processor; and
a non-transitory computer-readable storage medium coupled to the at least one processor and storing programming instructions for execution by the at least one processor, wherein the programming instructions instruct the at least one processor to:
determine a subframe for scheduling the first terminal;
determine a subframe set to which the subframe belongs, wherein the subframe set is a first subframe set or a second subframe set, and the first subframe set and the second subframe set correspond to different CQI adjustment amounts;

divide a plurality of scheduling subframes into the first subframe set and the second subframe set, wherein dividing the plurality of scheduling subframes into the first subframe set and the second subframe set comprises:

obtaining acknowledgement (ACK)/negative acknowledgement (NACK) (ACK/NACK) information of a plurality of scheduled terminals; and dividing the plurality of scheduling subframes into the first subframe set and the second subframe set based on the ACK/NACK information of the plurality of scheduled terminals;

adjust the CQI based on a CQI adjustment amount corresponding to the subframe set to which the subframe belongs; and determine, based on an adjusted CQI, a modulation and coding scheme MCS for scheduling the first terminal.

9. The base station according to claim 8, wherein the programming instructions instruct the at least one processor to:

collect statistics about a block error rate (BLER) of each of the plurality of scheduling subframes based on the ACK/NACK information of the plurality of scheduled terminals; and divide the plurality of scheduling subframes into the first subframe set and the second subframe set based on the BLER of each of the plurality of scheduling subframes.

10. The base station according to claim 9, wherein the programming instructions instruct the at least one processor to:

when an adjustment moment arrives, obtain a BLER of each of the plurality of scheduling subframes prior to the adjustment moment; and adjust, based on the BLER of each of the plurality of scheduling subframes prior to the adjustment moment, subframes in a first subframe set and a second subframe set prior to the adjustment moment to obtain the first subframe set and the second subframe set.

11. The base station according to claim 10, wherein the first subframe set prior to the adjustment moment comprises a first scheduling subframe;

the programming instructions instruct the at least one processor to:

when the adjustment moment arrives, obtain a BLER of the first subframe set prior to the adjustment moment; and if the BLER of the first subframe set prior to the adjustment moment is greater than a first threshold and a BLER of a first subframe in the first subframe set prior to the adjustment moment is greater than a second threshold, change, at the adjustment moment, the first scheduling subframe from the first subframe set prior to the adjustment moment to the second subframe set prior to the adjustment moment to obtain the first subframe set and the second subframe set.

12. The base station according to claim 11, wherein the second subframe set prior to the adjustment moment comprises a second scheduling subframe, and the programming instructions instruct the at least one processor to:

when the adjustment moment arrives, obtain a BLER of the second subframe set prior to the adjustment moment; and if the BLER of the second subframe set prior to the adjustment moment is greater than a third threshold and a BLER of a second subframe in the second subframe set prior to the adjustment moment is less than or equal to a fourth threshold, change, at the adjustment moment, the second scheduling subframe from the second subframe set prior to the adjustment moment to the first subframe set prior to the adjustment moment to obtain the first subframe set and the second subframe set.

13. The base station according to claim 9, wherein the programming instructions instruct the at least one processor to:

collect statistics about the BLER of each of the plurality of scheduling subframes by using the following formula:

$$Bler(i) = \frac{N_{NACK}(i) + N_{DTX}(i)}{N_{NACK}(i) + N_{DTX}(i) + N_{ACK}(i)}$$

wherein:

BLER (i) represents a BLER of an $i^{th}$ subframe in the plurality of scheduling subframes within a preset time;

$N_{NACK}(i)$ represents a quantity of NACKs that are fed back by a terminal within the preset time based on downlink data transmitted in the $i^{th}$ subframe;

$N_{ACK}(i)$ represents a quantity of ACKs that are fed back by the terminal within the preset time based on the downlink data transmitted in the $i^{th}$ subframe; and $N_{DTX}(i)$ represents a quantity of discontinuous transmission DTX states in which no signal is sent by the terminal in the $i^{th}$ subframe within the preset time.

14. The base station according to claim 8, wherein the first terminal is a terminal of which an amount of data received and reaching radio link control (RLC) per second is greater than a preset threshold.

15. A non-transitory computer-readable storage media comprising instructions which, when executed by one or more processors, cause the one or more processors to perform operations comprising:

receiving, by a base station, a channel quality indicator (CQI) sent by a first terminal, wherein the first terminal is a terminal of which an amount of data received and reaching radio link control (RLC) per second is greater than a preset threshold;

determining, by the base station, a subframe for scheduling the first terminal;

determining, by the base station, a subframe set to which the subframe belongs, wherein the subframe set is a first subframe set or a second subframe set, and wherein the first subframe set and the second subframe set correspond to different CQI adjustment amounts;

dividing, by the base station, a plurality of scheduling subframes into the first subframe set and the second subframe set, wherein dividing the plurality of scheduling subframes into the first subframe set and the second subframe set comprises:

obtaining, by the base station, acknowledgement (ACK)/negative acknowledgement (NACK) (ACK/NACK) information of a plurality of scheduled terminals; and dividing, by the base station, the plurality of scheduling subframes into the first subframe set and the second subframe set based on the ACK/NACK information of the plurality of scheduled terminals;

adjusting, by the base station, the CQI based on a CQI adjustment amount corresponding to the subframe set to which the subframe belongs; and determining, by the base station based on an adjusted CQI, a modulation and coding scheme (MCS) for scheduling the first terminal.

16. The non-transitory computer-readable storage media according to claim 15, wherein the dividing the plurality of scheduling subframes into the first subframe set and the second subframe set based on the ACK/NACK information of the plurality of scheduled terminals comprises:

collecting statistics about a block error rate (BLER) of each of the plurality of scheduling subframes based on the ACK/NACK information of the plurality of scheduled terminals; and dividing the plurality of scheduling subframes into the first subframe set and the second subframe set based on the BLER of each of the plurality of scheduling subframes.

17. The non-transitory computer-readable storage media according to claim 16, wherein the dividing, by the base station, the plurality of scheduling subframes into the first subframe set and the second subframe set based on the BLER of each of the plurality of scheduling subframes comprises:

when an adjustment moment arrives, obtaining, by the base station, a BLER of each of the plurality of scheduling subframes prior to the adjustment moment; and adjusting, by the base station based on the BLER of each of the plurality of scheduling subframes prior to the adjustment moment, subframes in a first subframe set and a second subframe set prior to the adjustment moment to obtain the first subframe set and the second subframe set.

18. The non-transitory computer-readable storage media according to claim 15, wherein the first terminal is a terminal of which an amount of data received and reaching radio link control (RLC) per second is greater than a preset threshold.

* * * * *